Jan. 22, 1946.    R. W. BROWN    2,393,493
SHOCK STRUT
Filed March 23, 1942    9 Sheets-Sheet 1

INVENTOR
Roy W. Brown
BY
ATTORNEYS

Jan. 22, 1946. R. W. BROWN 2,393,493
SHOCK STRUT
Filed March 23, 1942 9 Sheets-Sheet 2

INVENTOR
Roy W. Brown
BY Ely & Frye
ATTORNEYS

Jan. 22, 1946.     R. W. BROWN     2,393,493
SHOCK STRUT
Filed March 23, 1942     9 Sheets-Sheet 4

INVENTOR
Roy W. Brown
BY
ATTORNEYS

INVENTOR
Roy W. Brown
ATTORNEYS

Patented Jan. 22, 1946

2,393,493

UNITED STATES PATENT OFFICE 2,393,493

SHOCK STRUT

Roy W. Brown, Akron, Ohio, assignor to The Firestone Tire & Rubber Company, Akron, Ohio, a corporation of Ohio Application March 23, 1942, Serial No. 435,919

12 Claims. (Cl. 244—104)

This invention relates generally to shock struts, and more particularly it relates to shock struts employing the "air-spring" principle.

A primary object of the invention is to provide a shock strut without a packing gland, whereby difficulties of gland leakage and excessive friction are eliminated.

A further object of the invention resides in the provision of an improved shock strut particularly adapted for use on airplane landing gear wherein the strut operates both as a suspension member and as a shock absorbing member.

Another object is to provide an improved telescopic strut wherein both frictional engagement between the telescoping members and air compression therebetween is employed as shock absorbing means.

A further object is to provide improved valve mechanism in a telescopic strut.

Another object is to provide an improved pneumatically cushioned strut wherein a bellows-like chamber communicates with telescopically associated members in a manner wherein air compression within the telescopic members is accompanied with simultaneous compression of air in the bellows to produce improved cushioning characteristics of the device.

Still another object is to provide an airplane suspension and shock absorbing gear which is light in weight though rugged in construction, while completely eliminating the use of impact absorbing springs.

A still further object is to provide improved means for constraining telescopically associated strut members against relative rotation during operation of the device.

Other objects are generally to improve and simplify telescopic struts for one or more of the above mentioned purposes, and particularly with reference to airplane landing structure.

In the drawings.

Like parts are identified by the same reference numerals throughout the specification.

Figure 1:
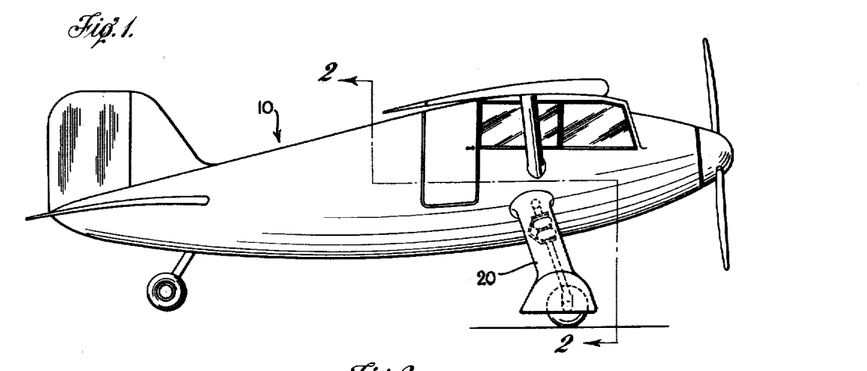
Fig. 1 is a side elevation of an airplane showing the present invention incorporated therein.
Figure 2:
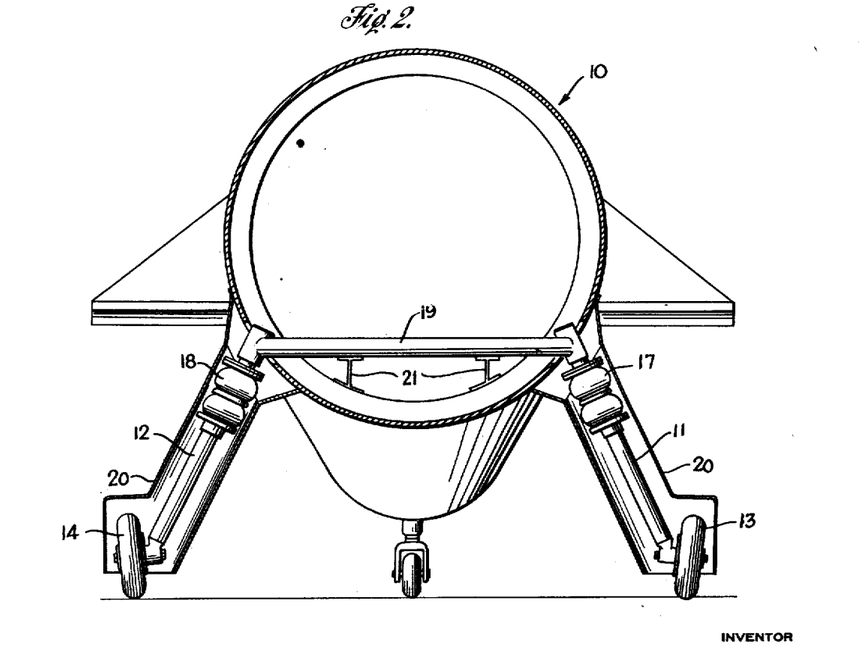
Fig. 2 is a section along line 2—2, Fig. 1.

Figs. 1 and 2 show an airplane, generically designated by reference numeral 10, having a landing gear including tubular struts 11 and 12 carrying wheels 13 and 14 respectively and provided with air spring bellows 17 and 18. A horizontal bar 19 connects the upper ends of the struts, and streamlined housings or "pants" 20, enclose each strut and extend partially over each wheel. Bar 19 is fixed to rigid fuselage frame elements 21. The upper ends of struts 11 and 12 are fixed to the ends of bar 19, preferably by welding, the struts extending downwardly and diagonally outwardly as shown in Figs. 2 and 3.

Figures 3, 4:
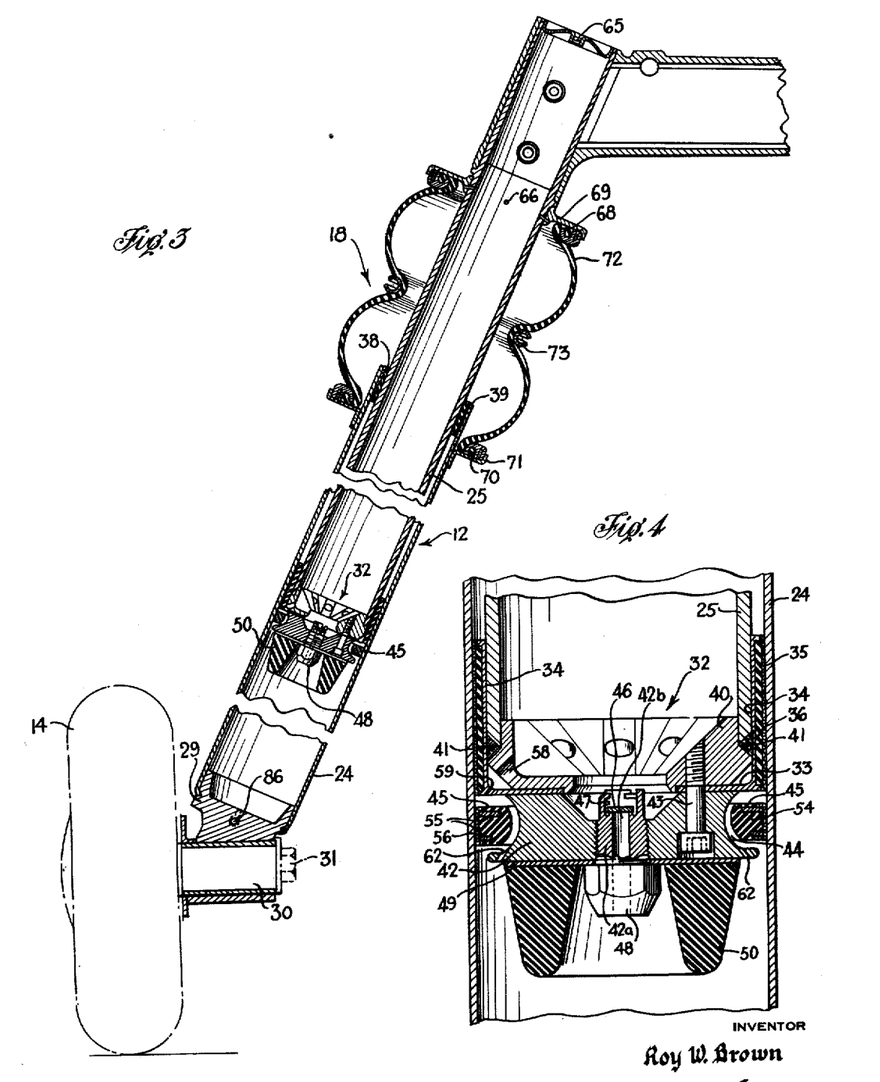
Fig. 3 is a vertical section through one of the strut assemblies shown in Fig. 2.
Fig. 4 is an enlarged detail of the valve shown in Fig. 3.
Figure 11:
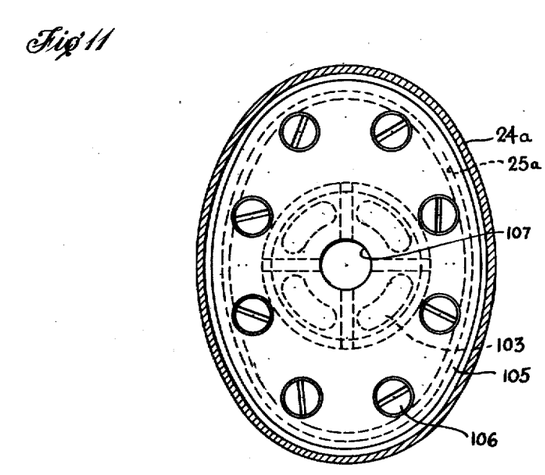
Fig. 11 is taken along line 11—11, Fig. 10.

Referring to Fig. 3, strut 12 includes a lower tubular member 24, and an upper tubular member 25 of reduced diameter, partially disposed within member 24 in telescopic relation thereto. Members 24 and 25 are elliptical in cross section as shown in Fig. 11 to prevent relative rotation therebetween.

The bellows-like air spring 18 has its end margins clampingly engaged with members 24 and 25 respectively, as later described. The lower end of member 24 carries a closure member 29, welded thereto for the mounting of wheel 14 on axle 30 which is removably clamped to the member by nut 31 as shown.

As best shown in Fig. 4, the lower end of member 25 is provided with a valve assembly 32 providing a restrictive closure therefor. The assembly includes a cup-shaped closure cap 33 having side walls 34 provided with a band of friction material for engagement with the inner wall surface of member 24, the friction material comprising a layer of square woven fabric 35, impragnated with oil and graphite, and a layer of rubber 36 forming a resilient backing therefor and bonded to the walls 34. The graphite and oil impregnated fabric snugly engages the inner wall of member 24 to serve the duo-function of providing a pneumatic seal between the telescopically related members and providing frictional resistance to relative axial movement therebetween.

The above described frictional material produces an appreciable friction load. The diagonal positioning of the strut as shown increases the frictional effect. The static co-efficient of friction of the material used is approximately .16 while the dynamic co-efficient is approximately .52, whereby energy absorption will increase with rapidity of wheel movements. The energy absorbed by friction will be dissipated as heat from the strut, hence it will not recur in the succeeding recoil movement.

The upper end of member 24 is provided internally with a band 38 of the above described friction material, bonded to a metallic sleeve 39 which is preferably welded to member 24. Band 38 has its graphite and oil impregnated fabric engaging the outer wall surface of member 25 in pneumatic sealing and frictional contact therewith, whereby the telescopic members are maintained in proper alignment for relative axial movement which is opposed by the sealing material.

Valve assembly 32 includes a centrally apertured plug 40, welded at 41 to the end margins in member 25, the lower end of the plug abutting the inner end wall of cup 33. A disc-like member 42 is clamped to the outer wall of the cup by cap screws 43 extending through said wall to engage the plug 40. Disc 42 is spool-like with concave sidewalls providing an annular channel 44 in which a floating ring 45, later described, is disposed. Disc 42 has a removable center plug 42a ported at 42b and provided with a check valve 46 for the control of fluid flow through the port during operation of the device. Valve 46 is of the flat disc type, movement of the disc being limited to the space within a cage-like guideway 47 comprising an integral extension of plug 42a. Plug 42a threadedly engages disc 42 and is constrained against removal by head 48. Disc 49 has a depending rubber bumper 50 vulcanized thereto, the disc being centrally clamped between head 48 and disc 42. Bumper 50 is adapted to contact closure 29 during compression of the strut to cushion the contact between tubular members 24 and 25 under heavy shock conditions.

Ring 45 comprises a rubber annulus 54 molded about metal reenforcement rings 55, annulus 54 having a peripherally applied graphite impregnated fabric band 56 in frictional engagement with the inner wall of tube 24. The fabric is maintained under a slightly expansive bias resulting from the metal reenforcements 55 being maintained within member 24 under slight contraction. The inner wall of annulus 54 is convexly arcuate and is of somewhat smaller diameter than the outer diameter of disc 42, whereby the disc loosely retains the ring during reciprocation of the tube 24 in respect to tube 25, the ring alternately engaging opposing wall portions of the dished outer wall of disc 42 later described.

During landing, impacts between wheel 14 and the ground cause tube 24 to slide upwardly over tube 25 against the opposition to such movement by frictional material 35 and 38, above described, and against resistance to air compression as later described. While the strut is adapted to operate with air under pressure, other gases, or a liquid may be used. Ring 45 is moved into sealing engagement with disc 42 along the upper wall of chamber 44 by reason of the engagement between frictional material 56 of ring 45 and inner walls of tube 24. Movement of ring 45 into the position described closes ports 59 to prevent air flow through ports 58 between the interior of tube 24 and interior of tube 25 except as controlled by the flow through the orifice 42b, check valve 46 being maintained open during the uptake. When the strut is allowed to expand, tube 24 moving in a downward direction, ring 45 moves downward to contact dished wall portions of disc 42. In this position of ring 45, air may flow from the interior of member 25 through ports 58 and 59 through chamber 44, and through notches 62 to the interior of tube 24. During expansion, the ring is maintained against the lower sidewall portion of the disc 42 by reason of the frictional engagement between the outer ring wall and the inner wall of tube 24.

The fluid flow control means disposed intermediate the interiors of the telescopically disposed tubes regulates air compression within both tube interiors, the compression within tube 24 being substantially greater during impacts than is the compression within tube 25, the air pressure in each tube, however, being quickly equalized. The upper end of tube 25 is plugged at 65 and is provided at 66 with apertures leading into the air spring bellows 18 which has an upper end 68 clamped in sealing engagement with a flange 69 mounted on tube 25, and a lower end portion 70 clamped to flange 71 in sealing engagement with tube 24.

Air spring 18 comprises a tubular wall 72 of rubber and fabric construction which may be substantially identical with the air spring bellows described in my issued Patent No. 2,208,537. The bellows wall 72 comprises upper and lower interconnected annular chambers and is provided substantially midway between its ends with an externally applied girdle 73 of split ring form in cross section, said girdle being floatably carried during operation to maintain the air spring wall in a position to define plural chambers.

Figure 7:
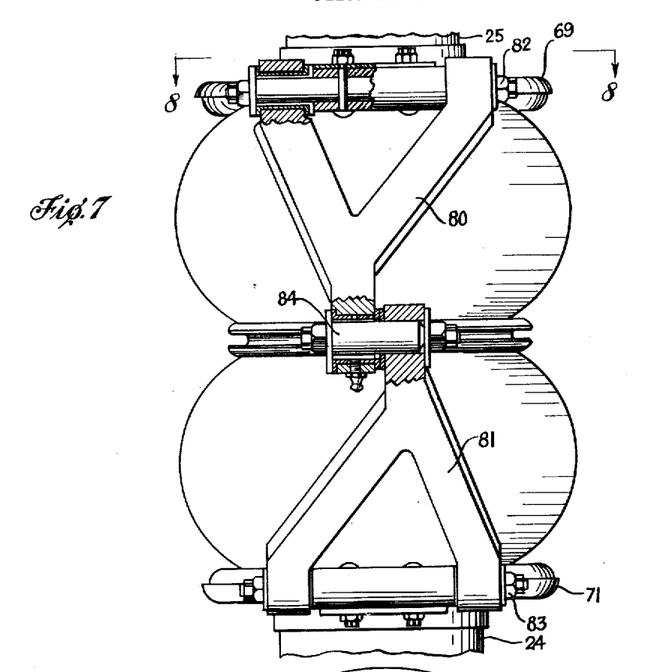
Fig. 7 illustrates a method of positively connecting the telescopic members of the device shown in Fig. 3 without restricting operation of the air spring.
Figure 8:
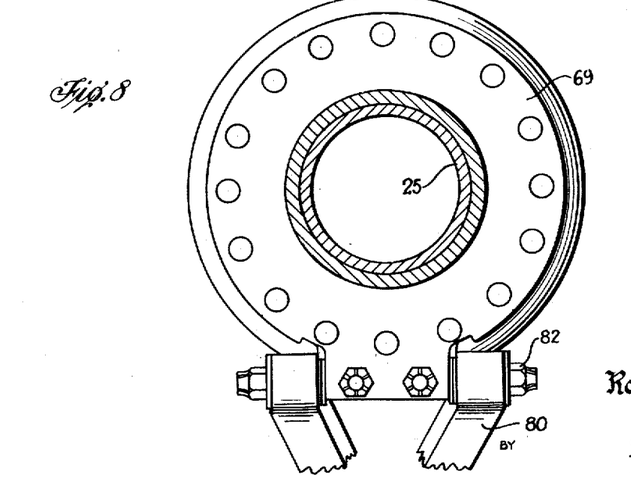
Fig. 8 is taken along line 8—8, Fig. 7.
Figure 14:
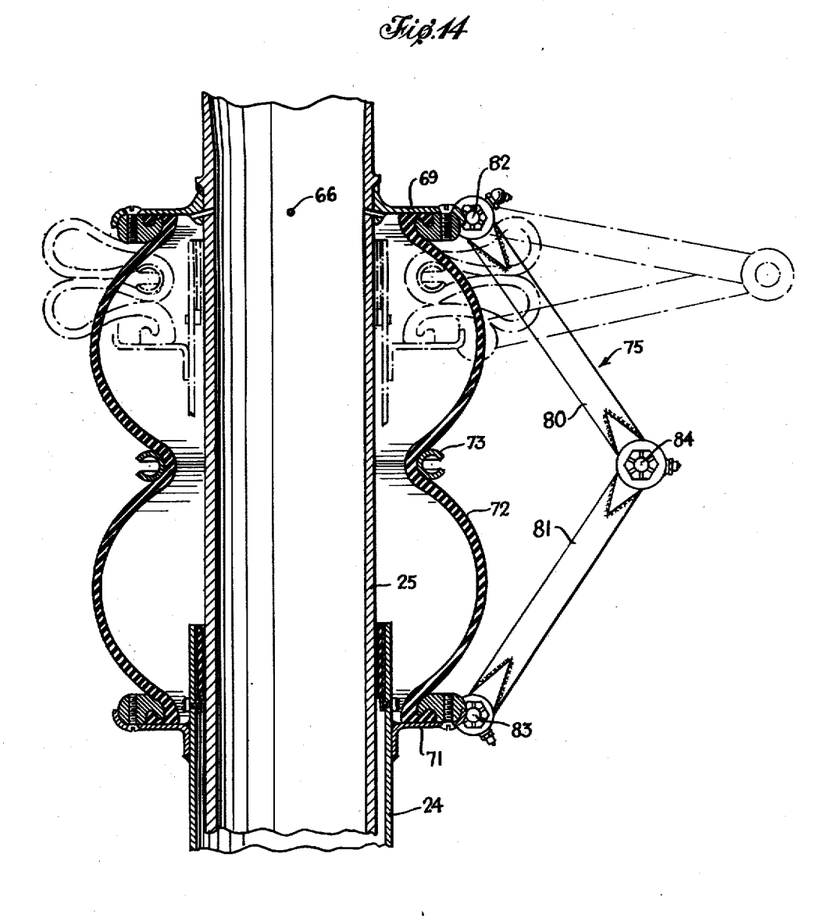
Fig. 14 illustrates in vertical section, the distended and contracted position of the air spring and its associated telescopic members.

A scissors-like connector device 75, Figs. 7, 8 and 14, pivotably engages flanges 69 and 71 to limit the extent of travel between the tubular members, the position of the bellows wall during maximum contraction of the strut, being shown in dotted lines. The air cushioning principles employed herein are identical with the principles fully illustrated in my above mentioned Patent No. 2,208,537. Hence, operational characteristics will not be repeated in detail herein. It will be understood, however, that the air spring bellows operates both as a spring cushioning means and as a shock absorption means. See "Air Springs—Tomorrow's Ride," S. A. E. Journal, volume 38, #4, page 126.

The strut is adapted to normally operate between a distended position as shown in heavy lines, Fig. 14, and a contracted position as shown in dotted lines, reference hereinafter being made to the expansion stroke and the compression stroke, respectively. Extension between telescopic members 24 and 25 is normally limited by the maximum elongation of the bellows. Scissors 75 provide protective means in case of damage to the bellows resulting in their failure to positively connect the tubular members 24 and 25. The scissors include arms 80 and 81 pivoted to flange 69 at 82 and to flange 71 at 83, the arms having their opposite ends pivotally connected at 84. The pivots at 82, 83 and 84 may be restrictive to prevent scissors 75 from opening beyond the position shown in Fig. 14 thereby preventing undue strain on the air spring bellows 67 during operation of the strut, if desired.

The device operates at an air pressure considerably higher than atmospheric. An inflation valve, disposed at the rear of the strut as viewed in Fig. 3, communicates with the interior of the tube 24 through passage 86. Pneumatic pressure is applied through the inflation valve, the entire strut providing a closed pressure-tight unit inflatable to a degree determined in practice by the magnitude of the load carried thereby. Inflation is made from a source of supply of clean air, which is preferably dehydrated if the airplane to which the strut is attached is to fly at high altitudes. The provision of dehydrated air eliminates the possibility of moisture condensation, which at temperature below freezing is apt to result in the strut being rendered less efficient or inoperative. In actual practice air pressure is applied from a source not exceeding 100 pounds per square inch until the strut lifts the plane two to four inches above the fully deflated position.

Figures 5, 6:
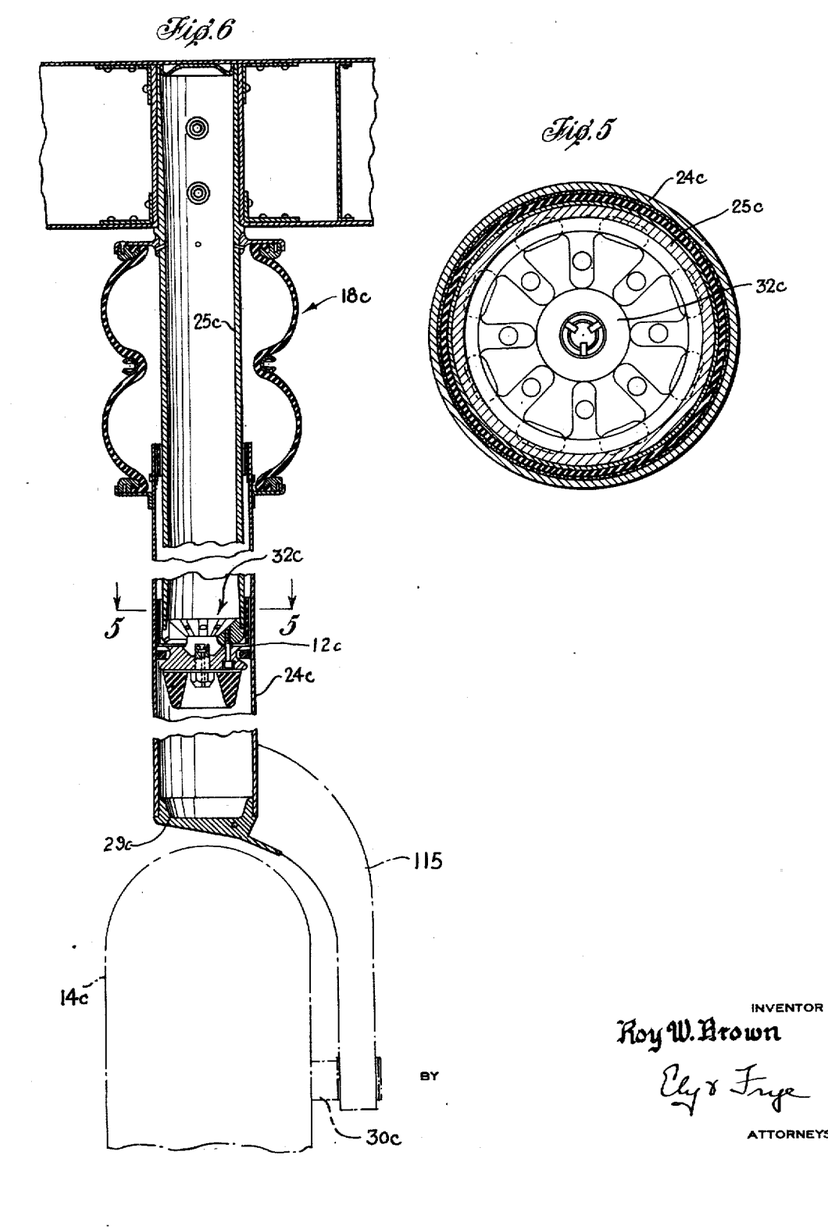
Fig. 5 is a view along line 5—5, Fig. 6.
Fig. 6 shows in vertical section an airplane strut having an alternate embodiment of my invention incorporated therein.

Referring to Figs. 5 and 6 there is shown a construction which is the same as that of Figs. 3 and 4, except that in the construction shown in Figs. 5 and 6 the lower end of the lower member of the telescoping members of the strut illustrates another arrangement by which a wheel may be carried by the strut. Thus in Figs. 5 and 6 strut 12c includes a lower tubular member 24c and an upper tubular member 25c of reduced diameter, partially disposed within member 24c in telescopic relation thereto. Members 24c and 25c may be elliptical in cross section as shown in Fig. 11 to prevent rotation therebetween.

The bellows-like air spring 18c has its end margins clampingly engaged with members 24c and 25c respectively. The lower end of member 25c is provided with valve means 32c and the lower end of member 24c carries a closure member 29c welded thereto and carrying a wheel 14c on an axle 30c mounted in the lower end of an offset, or cantilever, arm 115, which is attached to the closure member 29c and the lower end of the strut 24c in any manner found satisfactory, as by welding.

Figure 9:
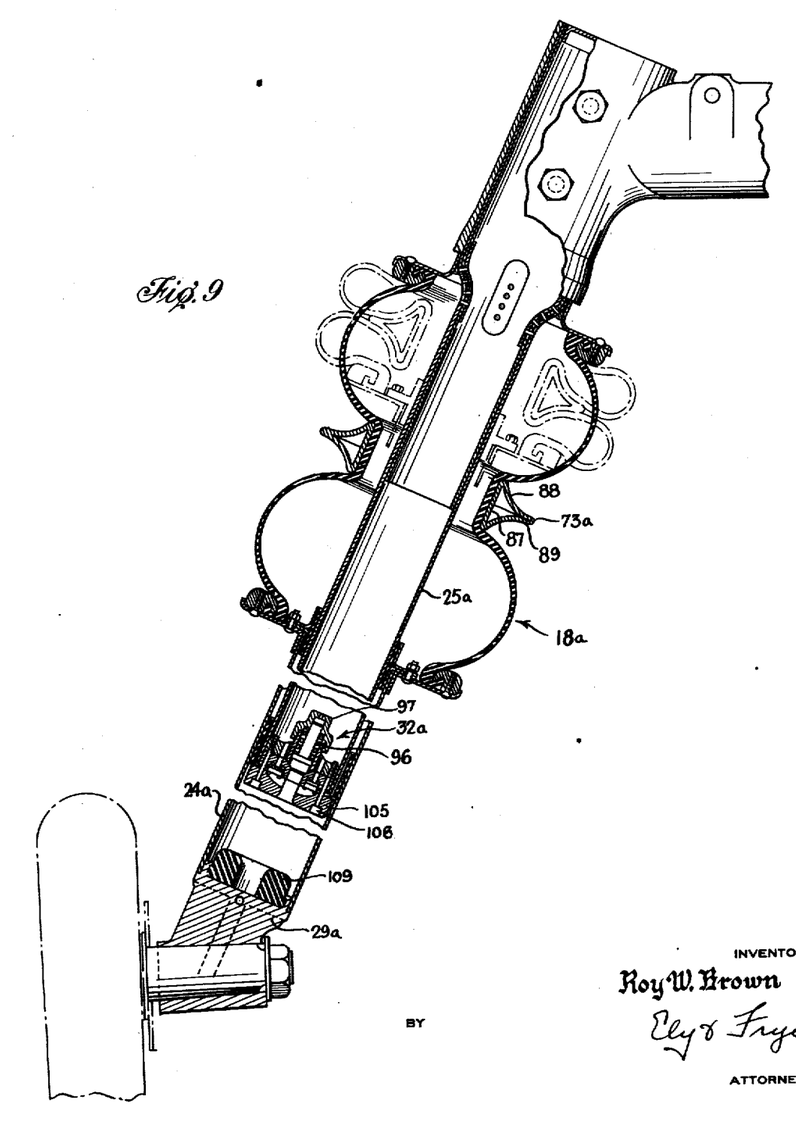
Fig. 9 is a vertical section through an air spring strut showing an alternate embodiment of the invention.

An alternative embodiment of the invention is shown in Fig. 9 wherein telescopically joined strut members 24a and 25a have connected therebetween the bellows 18a, the bellows having a medial region constricted by a girdle 73a including a cylindrical inner wall 87 and a pair of symmetrical outwardly extending transversely dished walls 88 and 89, the walls being joined along their outer-most margins. At maximum compression of the strut members, the bellows assume the position shown in dotted lines, Fig. 9.

The inner strut member 25a of the embodiment of Fig. 9 is provided at its lower end with valve means differing from the above described valve means of Figs. 3 and 4 primarily through the provision of a spring biased plug valve to limit pneumatic flow intermediate the chambers during the compression stroke in place of the orifice valve accomplishing this function in the initial embodiment. Air flow through an orifice type valve is an arithmetical function of the speed of member 24, operating in member 25 as a piston whereas air flow through the spring biased valve is a geometric function of piston speed, until the valve is completely open, the valve operating as an orifice valve at speeds thereabove.

Figure 10:
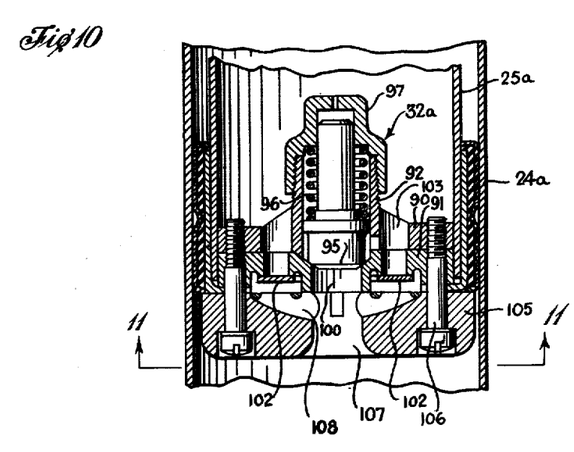
Fig. 10 is an enlarged sectional detail of the valve mechanism of Fig. 9.

The spring biased valve means comprises an asesmbly 32a forming a lower end closure for strut member 25a. Assembly 32a, as best shown in Fig. 10, includes plates 90 and 91 mounted inwardly of member 25a, preferably by being welded thereto. Plate 90 includes a centrally disposed vertical sleeve portion 92 for reception of a plug valve 95 which is maintained under a downward urge by a compression spring 96 intermediate the head of valve 95 and a retainer cap 97 which provides an upper bearing for the stem of valve 95. Plate 91 is provided with a central port 100 and an adjacent valve seat portion for the engagement of valve 95 therewith. Disc type check valves 102 prohibit air passage through the strut connecting ports 103 during the compression stroke while allowing air passage therethrough during the expansion stroke. In common with the valve structure disclosed in Figs. 3 and 4, relatively free air passage is allowed between the telescopic strut members during the expansion stroke, the passage therebetween being substantially restricted by the centrally disposed valve during the compression stroke. A metallic cap 105 is clamped to the lower end of member 25a by cap screws 106, the cap having a central port 107 aligned with the central port 100 of plate 91, and plural radially extending ports 108 leading therefrom to each check valve 102. The lower end of member 25a has peripherally applied friction material, heretofore described, with its outer surfaces engaging the inner wall of member 24a as described in connection with embodiments of Figs. 3 and 4. A rubber bumper 109 is mounted on closure 29a in a position for cushioning engagement of cap 105 therewith during maximum compression of the telescopic members.

Figure 12:
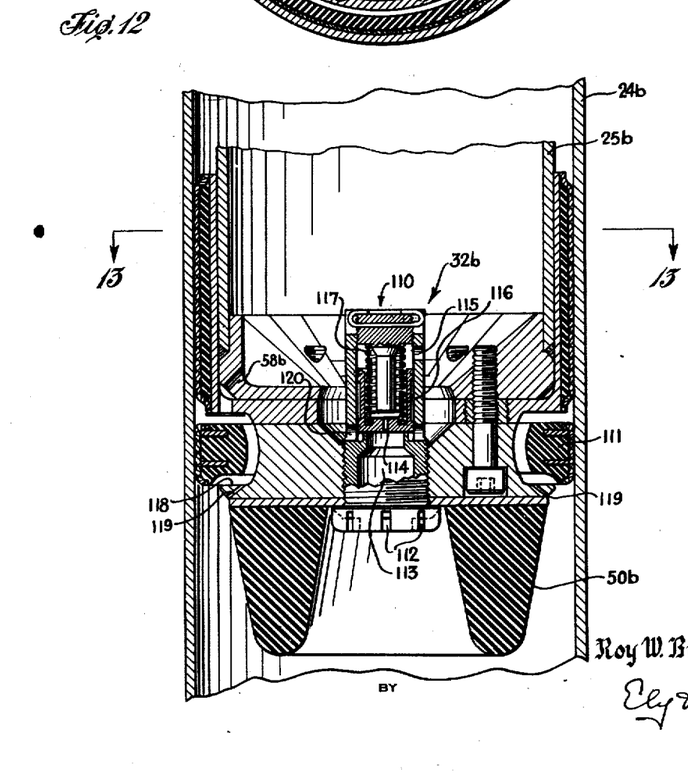
Fig. 12 shows in fragmentary vertical section an alternate valve mechanism.
Figure 13:
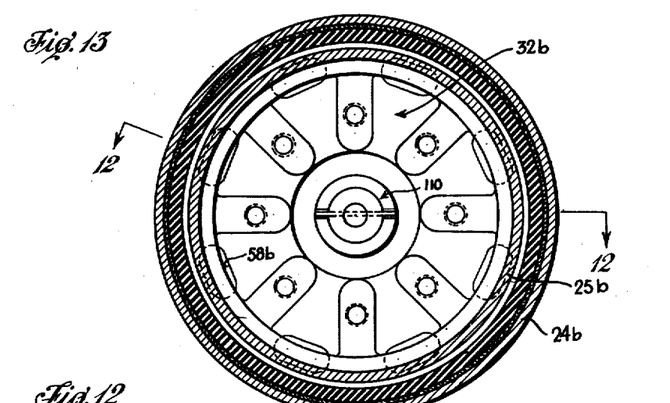
Fig. 13 is a section taken along line 13—13, Fig. 12.

Another embodiment of the invention is shown in Figs. 12 and 13 wherein a valve structure 32b is provided with a centrally disposed spring biased valve 110 and a floating ring 111 adapted to provide check valve means in a manner heretofore described. Valve 110 operates in the following manner.

During a slow compression stroke the air compressed within the lower strut chamber flows through slots 112 into the chamber 113 and upwardly through orifice 114 and port 115 to enter the upper chamber. If the air compression within the lower chamber is sufficient to move piston 116 upwardly against the urge of compression spring 117, a much larger volume of air escapes between the lower piston wall and the valve seat to flow through apertures 120 into the upper chamber. In this manner the rate of pressure equalization between the upper and lower strut chambers varies, within limits, in proportion to pressure differential therebetween during the compression stroke. Within limits, the greater the pressure differential between the lower and upper chambers, the greater will be the communicating passage therebetween since the compression of the spring 117 is proportional to said pressure differential.

During the compression stroke the upper wall of ring 111 effectively seals the entrance to multiple ports 58b, but during the expansion stroke the ring moves into engagement with the opposite wall 118 of its retaining channel and to permit air to flow freely between the strut chambers during the compression stroke. A plurality of circumferentially spaced passageways 119 are provided in said lower wall, each passageway leading from an inner wall area diagonally outwardly to communicate with the lower chamber.

Figs. 15, 16, 17 and 18 show an alternative embodiment of the invention wherein the inner tubular member of the strut is provided with a piston type valve to permit air flow between the telescoping members only when the ring 45d is intermediate the end walls 123 and 124 of channel 121. In this embodiment, the upper end of the fixed strut member 25d is closed, no fluid passage being provided between the interior of member 25d and the bellows 18d except through a path which includes the annular channel 138 defined between the spaced telescopic strut members and plural circumferentially spaced ports 136 connecting the channel with the bellows.

Figures 15, 16, 17, 18:
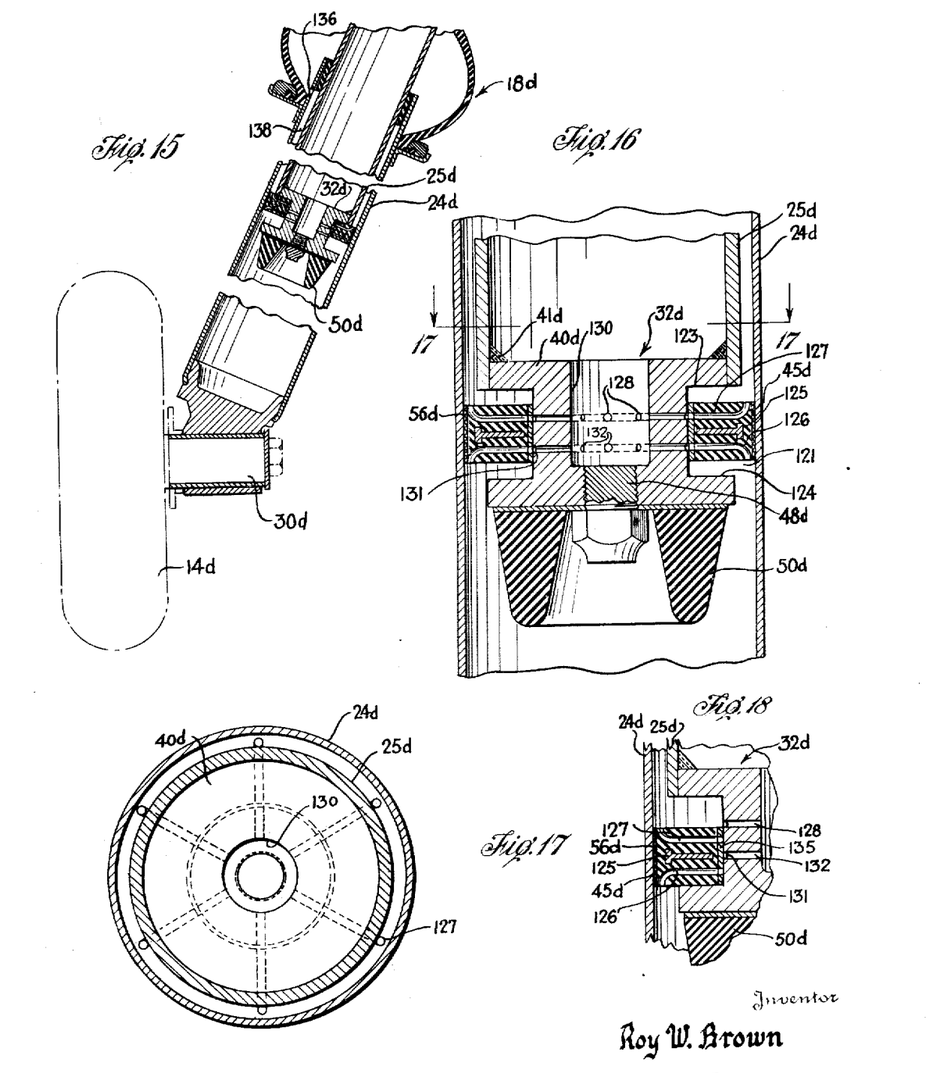
Fig. 15 is a vertical section through a lower portion of the strut shown in Fig. 3 but showing another embodiment of the invention incorporated therein, showing the valve in closed position as during the compression stroke.
Fig. 16 is an enlarged detail, in section, of the valve structure of Fig. 15, with the valve shown open.
Fig. 17 is taken along line 17—17, Fig. 16.
Fig. 18 shows in fragmentary section the valve closed during the expansion stroke.

As best shown in Fig. 16, the lower end of the strut member 25d carries a valve assembly 32d providing a restricted closure thereof. Assembly 32d comprises a plug 40d, centrally chambered at 130, and provided with an outwardly open circumferential channel 121 in which a sealing ring 45d is floatably disposed. Plug 40d has an upper portion extending into strut member 25d and welded thereto at 41d, with the chamber 121 below the end of the strut. The bumper 50d is clamped by stud bolt 48d to the lower end of plug 40d, bolt 48d threadedly engaging the lower plug end.

Floating ring 45d sealingly engages the inner wall of member 24d, the ring being provided with peripherally applied friction material 56d as above described. A brass sleeve 135 provides an inner ring surface engageable with the inner wall of channel 121 to present frictional contact therewith of substantially less magnitude than the frictional contact between material 56d and strut member 24d, hence the ring is moved by the strut within limits defined by channel 121. Ring 45d is of less width than channel 121 whereby during relative reciprocation of the strut members, the ring is reciprocated within the channel between valve closed positions of engagement with the upper channel wall 123 and the lower channel wall 124. The body of ring 45d is made up largely of rubber-like material molded about an annular metallic reenforcing member 125, the ring being provided at the lower side of the reenforcing member with a plurality of radially extending fluid transfer ports 126, circumferentially spaced, and at the upper side with a plurality of radially extending circumferentially spaced ports 127. Ports 126 and ports 127 fall respectively in planes radially disposed respecting the axis of strut member 25d, the planes being axially spaced in respect thereto. The central portion of plug 40d is provided with a plurality of radially extending ports 128 connecting channel 121 with chamber 130. Ports 128 have their outer ends interconnected by a circumferential channel. During the compression stroke ring 45d is maintained in a valve closed position against upper channel wall 123, due to the difference in friction between material 56d and sleeve 135 as above described. During the expansion stroke the ring is maintained in a valve closing position against the lower channel wall 124 due to reversal of relative movement between members 24d and 25d.

As the compression motion ceases and the extension motion is initiated, the valve control ring 45d moves momentarily by friction, into the valve opening position shown in Fig. 16, with radially disposed ring ports 127 aligned with radial plug ports 128 and ring ports 126 aligned with plug ports 132, thus enabling pressure equalization between the bellows, the reservoir constituting the interiors of the members 24d and 25d, and the annular chamber between the ends of said members. Thus in the present embodiment, valve assembly 32d positively controls fluid communication between the bellows and the reservoir constituting the space interiorly of the strut members, and also controls fluid flow from one telescoped member to the other. This construction permits maximum damping or shock absorber action, of which the air spring bellows reservoir system is capable. If desired to limit the damping to less than the maximum, cap screw 48d may be provided with an axial bore constituting a fixed orifice between the tubular members. Since the bellows and the strut members are connected only momentarily at the end of each stroke as ported ring 45d traverses the port section of plug 40d, the performance of the device can be altered by varying the size of ports 128 and 132, or conversely varying the size of the ring ports 126 and 127. The present strut has an added advantage in that the employment of strut members, elliptical in cross section to prevent relative rotation and with friction material disposed therebetween, eliminates the necessity for accurate machining of the telescoped members. The elimination of a packing gland is also a highly desirable feature since gland leakage has been very common in telescopic struts adapted to be either hydraulically or pneumatically cushioned. The above described structure automatically equalizes the pressures in the bellows and in the tubular members irrespective of the temporary position of compression of the bellows. In other words automatic pressure equalization therebetween may take place when conditions cause stroke reversal regardless of the relative position of the tubular strut members at such time.

What is claimed is:

1. An airplane supporting device comprising a tubular member secured to an airplane and extending downwardly therefrom, a second tubular member telescopically engaged with the first member and having a landing wheel carried thereby, a pneumatic bellows applied externally of said tubular members in fluid sealing relation thereto, valve means for controlling fluid flow between the members, means for connecting the interior of the upper member with said interior of the bellows, and friction means carried by at least one of the tubular members whereby telescopic movement therebetween is opposed, said friction means having a dynamic co-efficient of friction substantially greater than its static co-efficient of friction.

2. In a shock absorbing suspension device, adapted for inter-position between an airplane and a land contacting wheel, said device including a cylinder engaging said wheel to extend upwardly therefrom, and a hollow piston having its upper end fixed to the airplane and its lower end disposed within said cylinder for reciprocation in respect thereto; a pneumatic bellows applied externally of said piston and cylinder, and having one end sealed to the piston and an opposite end sealed to the cylinder, means for fluid communication between the interior of said hollow piston and the space intermediate the bellows and the outer walls of the cylinder and piston, valve means associated with the piston for the control of fluid between the piston interior and the cylinder interior, and means for the admission of fluid under pressure to the interior of the cylinder.

3. An airplane landing device comprising a tubular member adapted to be fixed to an airplane and to extend downwardly therefrom, a second tubular member telescopically associating with the first member and having a landing wheel attached thereto, said tubular members being adapted for relative reciprocable movement a resilient bellows disposed concentrically about the members with opposite end margins in sealed engagement with the outer walls of the respective members, valve means connecting said bellows with the interior of at least one of the telescoping members for fluid flow therebetween, and means limiting relative reciprocable movement between the members, said means comprising an arm pivoted to each of said members, the arms having opposite ends in mutual pivotal relation.

4. An airplane landing gear strut including a cylinder and a hollow piston reciprocable therein, means limiting relative movement therebetween, valve means for controlling fluid flow through the head of said piston, a pneumatic bellows connected intermediate the outer wall of the piston and the outer wall of the cylinder to provide a chamber therebetween, fluid communication means between the bellows chamber and the interior of the piston, said communication means being in the form of apertures in the wall of said cylinder, said apertures being so located as to provide uninterrupted fluid communication means between the bellows and the interior of the piston during a complete recipricatory action of said cylinder and piston, and a compressible fluid within the piston, cylinder, and bellows, said fluid being maintained therein under a pressure greater than atmospheric.

5. An airplane supporting device comprising a tubular member secured to the airplane and extending downwardly therefrom, a second tubular member secured to the landing gear for the airplane, said tubular members being in telescopic engagement, a pneumatic bellows secured between the upper end of the outer of said tubular members and an adjacent portion of the inner of said tubular members to seal the connection therebetween, the inner of said tubular members having a vent therein to enable flow of fluid from the interior thereof to said bellows, means for sealing the upper end of said first mentioned tubular member, means for sealing the lower end of said second mentioned tubular member, friction material fixedly positioned between the telescoping portions of said tubular members to resist relative movement thereof, and a valve secured in one of said tubular members to pass air therethrough more freely when said tubular members are being expanded than when they are being contracted.

6. In an airplane supporting device, tubular telescoping strut members for securing the landing gear to the airplane, said members being constructed and arranged to confine a volume of air therein, an air spring bellows connecting said members, and valve means carried by one of the members, said means being constructed and arranged to momentarily allow air pressure equalization between the bellows and tubular member interiors upon reversal of the direction of relative movement between said members, and to prevent air flow therebetween during the compression and expansion strokes.

7. An airplane supporting apparatus comprising telescoping members, said members being non-circular in cross section and forming a strut, one end of which is secured to the airplane and the other end of which carries a landing gear, a pneumatic bellows sealingly engaging said telescoping members, said bellows being adapted to vary in size during relative movement of the struts, means connecting the bellows with the interior of one of the telescoping members for fluid flow therebetween, friction means opposing telescopic movement between the members, and valve means responsive to telescopic movement of the members for the control of the fluid flow between the bellows and said telescoped members.

8. An airplane supporting device comprising a tubular member secured to the airplane, a second tubular member telescopically engaged in concentric spaced relation with the first member and having a landing wheel carried thereby, a bellows-like air spring applied externally of said tubular members in fluid-sealing relation thereto, said tubular members being retained in said spaced relation by means consisting of a band of friction material and a floating ring, fabric having a backing of rubber attached to the inner wall of said friction material being impregnated with oil and graphite, said band of friction material being in fluid-tight contact with the surfaces of said first and second members, a restrictive closure in the lower end of said first member, said closure being provided with an outwardly opening circumferentially extending channel, a sealing ring in slidable fluid-tight contact with said first member and channel surface, said tubular members being adapted for reciprocal telescopical motion, said ring having an upper and a lower series of radially extending holes, an upper and lower series of holes traversing said plug, whereby all compartments of said device temporarily communicate through temporary alignment of said holes as the ring is moved back and forth across the width of said channel by the reciprocal motion of said members.

9. An airplane supporting apparatus comprising tubular telescoping members, said members forming a strut, one end of which is secured to the airplane and the other end of which carries a landing gear, a pneumatic bellows sealingly engaging said telescoping members, said bellows being adapted to vary in size during relative movement of the struts, means connecting the bellows with the interior of one of the telescoping members for fluid flow therebetween, friction means opposing telescopic movement between the members, and valve means responsive to telescopic movement of the members for the control of the fluid flow between the bellows and said telescoped members.

10. An airplane supporting device comprising a tubular member secured to the airplane, a second tubular member telescopically engaged in concentric spaced relation with the first member and having a landing wheel carried thereby, a bellows-like air spring applied externally of said tubular members in fluid-sealing relation thereto, said tubular members being retained in said spaced relation by means consisting of a band of friction material and a floating ring, said friction material comprising a layer of fabric having a backing of rubber attached to the inner wall of said second member, said fabric being impregnated with oil and graphite, said band of friction material being in fluid-tight contact with the surfaces of said first and second members, a restrictive closure in the lower end of said first member, said closure comprising a plug centrally chambered and being provided with an outwardly opening circumferentially extending rectangularly shaped channel, a sealing ring of less width than the width of said channel interposed between the inner wall surface of said first member and the surface of said channel wall, said sealing ring being in slidable fluid-tight contact with said first member and channel surface, said tubular members being adapted for reciprocal telescopical motion, said ring having frictional contact of less magnitude with the radially inner surface of said channel than with the surface of said first tubular member, said ring having an upper series of radially extending holes opening at one end into the space between the walls of said members and at the other end of said hole at the radial inner surface of said ring, a lower series of said holes opening at one end into said second tubular member below the closed end thereof and at their other end opening on the radially inner surface of said ring, an upper and lower series of holes traversing the wall of said plug between said central chamber of said plug and said radial inner surface of said channel, whereby the holes in said rings are temporarily aligned with the holes in said plug as the ring is moved back and forth across the width of said channel by the reciprocal motion of said members thereby connecting all the compartments of the device at approximately the mid stroke position of the said members in their reciprocating motion.

11. An airplane supporting apparatus comprising tubular telescoping members, said members forming a strut, one end of which is secured to the airplane and the other end of which carries a landing gear, a pneumatic collapsible and extensible bellows sealingly engaging said respective telescoping members, means affording fluid flow connecting the bellows with the interior of one of the telescoping members and means responsive to telescopic movement of the members for controlling fluid flow between the bellows and said telescoped members.

12. An airplane supporting device comprising two tubular telescoping members forming a strut, the outer end of one of said members being secured to the airplane and the outer end of the other member carrying a landing gear, a pneumatic bellows, said bellows encasing the exposed juncture of said telescoped ends and forming an airtight seal with said members, said struts and bellows confining a volume of air, means connecting said bellows with the interior of at least one of said strut members for fluid flow therebetween, friction material fixedly secured between the adjacent and relative telescoping portions of said strut members and a safety latch pivotally secured between said members to limit the relative elongation thereof.

ROY W. BROWN.

Certificate of Correction

Patent No. 2,393,493.　　　　　　　　　　　　　　　　　　　　　　　January 22, 1946.

ROY W. BROWN

It is hereby certified that error appears in the printed specification of the above numbered patent requiring correction as follows: Page 4, first column, line 11, for "compression" read *expansion*; and that the said Letters Patent should be read with this correction therein that the same may conform to the record of the case in the Patent Office.

Signed and sealed this 14th day of May, A. D. 1946.

[SEAL]

LESLIE FRAZER,
*First Assistant Commissioner of Patents.* and having a landing wheel carried thereby, a bellows-like air spring applied externally of said tubular members in fluid-sealing relation thereto, said tubular members being retained in said spaced relation by means consisting of a band of friction material and a floating ring, said friction material comprising a layer of fabric having a backing of rubber attached to the inner wall of said second member, said fabric being impregnated with oil and graphite, said band of friction material being in fluid-tight contact with the surfaces of said first and second members, a restrictive closure in the lower end of said first member, said closure comprising a plug centrally chambered and being provided with an outwardly opening circumferentially extending rectangularly shaped channel, a sealing ring of less width than the width of said channel interposed between the inner wall surface of said first member and the surface of said channel wall, said sealing ring being in slidable fluid-tight contact with said first member and channel surface, said tubular members being adapted for reciprocal telescopical motion, said ring having frictional contact of less magnitude with the radially inner surface of said channel than with the surface of said first tubular member, said ring having an upper series of radially extending holes opening at one end into the space between the walls of said members and at the other end of said hole at the radial inner surface of said ring, a lower series of said holes opening at one end into said second tubular member below the closed end thereof and at their other end opening on the radially inner surface of said ring, an upper and lower series of holes traversing the wall of said plug between said central chamber of said plug and said radial inner surface of said channel, whereby the holes in said rings are temporarily aligned with the holes in said plug as the ring is moved back and forth across the width of said channel by the reciprocal motion of said members thereby connecting all the compartments of the device at approximately the mid stroke position of the said members in their reciprocating motion.

11. An airplane supporting apparatus comprising tubular telescoping members, said members forming a strut, one end of which is secured to the airplane and the other end of which carries a landing gear, a pneumatic collapsible and extensible bellows sealingly engaging said respective telescoping members, means affording fluid flow connecting the bellows with the interior of one of the telescoping members and means responsive to telescopic movement of the members for controlling fluid flow between the bellows and said telescoped members.

12. An airplane supporting device comprising two tubular telescoping members forming a strut, the outer end of one of said members being secured to the airplane and the outer end of the other member carrying a landing gear, a pneumatic bellows, said bellows encasing the exposed juncture of said telescoped ends and forming an airtight seal with said members, said struts and bellows confining a volume of air, means connecting said bellows with the interior of at least one of said strut members for fluid flow therebetween, friction material fixedly secured between the adjacent and relative telescoping portions of said strut members and a safety latch pivotally secured between said members to limit the relative elongation thereof.

ROY W. BROWN.

Certificate of Correction

Patent No. 2,393,493.   January 22, 1946.

ROY W. BROWN

It is hereby certified that error appears in the printed specification of the above numbered patent requiring correction as follows: Page 4, first column, line 11, for "compression" read *expansion*; and that the said Letters Patent should be read with this correction therein that the same may conform to the record of the case in the Patent Office.

Signed and sealed this 14th day of May, A. D. 1946.

[SEAL]

LESLIE FRAZER,
*First Assistant Commissioner of Patents.*